United States Patent Office 2,978,812
Patented Apr. 11, 1961

2,978,812
DENTURE FIXATIVES

Murray W. Rosenthal, New Brunswick, N.J., and Herbert A. Cohen, Brooklyn, N.Y., assignors to Block Drug Company, Inc., a corporation of Delaware No Drawing. Filed May 9, 1958, Ser. No. 734,125

15 Claims. (Cl. 32—2)

The present invention relates generally to artificial dentures, and it relates more particularly to an improved method and composition for securing an artificial denture plate in the mouth.

Artificial denture plates are produced generally by obtaining an impression of the soft tissues of the patient's mouth which will ultimately support the dental plates and then producing from this impression a suitable mold in plaster of Paris or other material which will harden on setting. Using this mold after hardening, a denture plate is produced, usually from synthetic organic plastic materials, which plate secures the artificial denture teeth and which has an under surface designed to have a configuration complementing that of the soft tissue in the mouth onto which the dental plate is to rest. If a very close fit is obtained between the soft tissue in the mouth and the underface of the dental plate surface, an adequate suction coupling may be effected. However, such a condition is rarely realized by reason of the normal variations occurring in the materials employed because of their temperature coefficients of expansion and the dimensional changes attending the setting and handling of the various materials. Moreover, the surface contours and dimensions of the soft tissue in the patient's mouth change with age so that a close fit of the denture plate as a permanent proposition rarely, if ever, is obtained.

It has long been the conventional practice for the denture wearer to apply a denture fixative agent between the confronting faces of the mouth tissues and the denture plate. These fixatives are usually agents which swell in contact with water or saliva thus forming gel-like masses and are employed primarily for the purpose of filling the spaces between the underface of the denture plate and the mouth tissue so as to effect a suction coupling or securement. Furthermore, they should possess sufficient tackiness in aqueous dispersion to inhibit accidental sliding of the denture within the mouth. There are many important characteristics which are sought after in a denture fixative. As mentioned above, they should be readily wetted and swell upon contact with water or saliva to form a tacky, resilient cushioning gel between the mouth and denture surfaces; they should maintain high viscosities for extended periods of up to 24 hours; they should be non-toxic and non-irritating to human tissues and they should not support bacterial growth while withstanding deterioration by oral fluids; they should be resistant to leaching, have little or no odor or taste and be of relatively low cost.

There have been no materials heretofore employed which satisfactorily fulfill all of the above requirements, and the fixatives now used are merely by way of compromise, leaving much to be desired. Gum karaya has been most extensively employed, being included in more than 95% of the denture fixatives used. However, gum karaya, being a product collected as a tree exudate, contains bark, dirt and other impurities. It decomposes on standing, even in dry form, to release acetic acid which imparts an unpleasant taste and odor and results in a reduction in the viscosity and swelling power of the product. Furthermore, the gum contains considerable bacteria which make its use unsanitary, and it may be attacked by certain of the oral microorganisms to give rise to undesirable decomposition products. Other natural gums such as tragacanth and acacia have been employed but these possess the drawbacks of gum karaya as well as other disadvantages. Cellulose derivatives including methylcellulose, hydroxyethyl cellulose and carboxymethylcellulose have been suggested as denture fixatives but possess insufficient tackiness, with consequent slipping of the denture; they dilute very rapidly with water so that their effectiveness is of too short duration, and they often do not form dispersions of sufficiently high viscosity with water or saliva to effect a good suction seal.

It is thus an object of the present invention to provide an improved method of securing an artificial denture plate to the supporting tissue in the mouth.

Another object of the present invention is to provide an improved fixative for artificial denture plates.

Still another object of the present invention is to provide an improved fixative for artificial denture plates which effects a comfortable and firm securement of the denture plate over long intervals of time.

A further object of the present invention is to provide an improved fixative for artificial denture plates which is inexpensive and simple to use.

Still a further object of the present invention is to provide an improved fixative for denture plates which is stable under storage conditions and in the presence of the oral fluids.

The above and other objects of the present invention have been achieved by the use, as an artificial denture plate fixative, of a composition in powder, paste or film form which contains from 0.5% to 100% of a polymer of ethylene oxide, which may also be identified as an ethylene oxide polymer, of a molecular weight exceeding approximately 500,000 and preferably between approximately 500,000 and 5,000,000, which possesses the general formula $H(OCH_2CH_2)_xOH$, wherein $x$ is between approximately 10,000 and 100,000. The polymer of ethylene oxide should preferably constitute at least 50% of the active fixative materials, but it also may be employed to great advantage in minor percentages admixed with other fixative materials of natural or synthetic origin.

It has been discovered that high molecular weight polymers of ethylene oxide of the above nature possess properties and characteristics which ideally suit them for use as a denture plate fixative, many of these qualities being of totally unexpected nature.

The high molecular weight polymers of ethylene oxide are rapidly wetted by water and do not form pockets of the wetted resin surrounded by unwetted material. When employed as denture plate fixatives, they form soft resilient gels between the plate and the soft tissue of the mouth to cushion any impact and absorb shock, and they maintain a hermetic seal between the under surface and edges of the denture plate and the oral tissue thereby to effect a firm vacuum coupling between the denture plate and the oral tissue. Furthermore, the resulting gels possess a high degree of tackiness so as to inhibit any undesirable slippage of the denture in the mouth. The ethylene oxide polymers maintain their body and high viscosity in a wide range of dilution with water and saliva, and although they are quickly and readily wetted with water they are resistant to rapid leaching thereby increasing the duration of their effectiveness as denture fixatives. They are non-toxic and non-irritating to human tissue, resistant to hydrolysis by salivary enzymes and hot and cold fluids and do not support bacterial growth so that these materials are stable both on storage and in the oral environment. The high molecular weight polymers of ethylene oxide possess the further advantages of being odorless, tasteless and white in color, they can be easily formed into free-flowing, non-caking powders, may be readily dispersed in hydrophobic paste carriers and can also be cast into sheet and continuous film. Enough of these properties of the high molecular weight polymers of ethylene oxide, even when used in relatively low proportions, are imparted to conventionally used gums as to improve them to a considerable extent.

The following is a general formula of an improved artificial denture fixative embodying the present invention:

| | Percent |
|---|---|
| Polymers of ethylene oxide, molecular weight from approximately 500,000–5,000,000 | 0.5–100.0 |
| Other gums of natural or synthetic orgin | 0.0–99.5 |
| Extenders, plasticizers, buffers, flow promoters, etc | 0.0–60.0 |
| Pigments and/or dyes | 0.0–2.0 |
| Flavor | 0.0–0.5 |

The following are examples of the improved denture fixative which are in powdered or finely granulated form:

Example 1

| | Percent |
|---|---|
| Ethylene oxide polymer, average molecular weight approximately 2,000,000 | 47.4 |
| Ethylene oxide polymer, average molecular weight approximately 1,000,000 | 47.4 |
| Diatomaceous earth | 5.0 |
| Flavor | 0.2 |

Example 2

| | Percent |
|---|---|
| Ethylene oxide polymer, average molecular weight approximately 2,000,000 | 72.8 |
| Amylopectin | 19.0 |
| Diatomaceous earth | 8.0 |
| Flavor | 0.2 |

Example 3

| | Percent |
|---|---|
| Ethylene oxide polymer, average molecular weight approximately 2,000,000 | 9.5 |
| Gum karaya | 89.8 |
| Diatomaceous earth | 0.5 |
| Flavor | 0.2 |

Example 4

| | Percent |
|---|---|
| Ethylene oxide polymer, average molecular weight approximately 2,000,000 | 9.5 |
| Gum karaya | 63.8 |
| Sodium borate | 6.0 |
| Aluminum hydrate | 20.0 |
| Diatomaceous earth | 0.5 |
| Flavor | 0.2 |

The diatomaceous earth in the above formulations improves the flow properties of the fixative, the amylopectin increases the immediate tack of the fixative, the sodium borate increases the viscosity of the resulting gel, and the aluminum hydrate is merely a filler.

In employing the powder type denture fixatives, in accordance with the formulations set forth above, the securing surface of the denture plate is cleaned and moistened with water. A layer of the powder fixative is then sprinkled on the wetted undersurface of the plate. The denture is then inserted in the mouth and pressed into engagement with the supporting oral soft tissue.

The following are examples of the improved denture fixative according to the present invention, in the form of extruded or rolled film in the shape of continuous bands, sheet or the like. The thickness of the film is preferably between 5 and 50 mils, for example, 10 mils.

Example 5

| | Percent |
|---|---|
| Ethylene oxide polymer, average molecular weight approximately 2,000,000 (in film form) | 99.8 |
| Flavor | 0.2 |

Example 6

| | Percent |
|---|---|
| Ethylene oxide polymer, average molecular weight approximately 1,000,000 | 79.8 |
| Carboxymethylcellulose | 15.0 |
| Nontoxic plasticizer | 5.0 |
| Flavor | 0.2 |

In employing the improved fixative in film form, strips thereof are superimposed on the wetted underface of the denture plate, which is then inserted in the mouth and firmly pressed against the confronting oral surface.

The improved denture fixative according to the present invention may be also put up in an extrudable or paste form in accordance with the following examples thereby to permit dispensing thereof from collapsible tubes:

Example 7

| | Percent |
|---|---|
| Ethylene oxide polymer, average molecular weight approximately 2,000,000 | 45.0 |
| Petrolatum | 45.0 |
| Magnesium oxide | 5.0 |
| Liquid petrolatum | 4.3 |
| Red dye or pigment | 0.1 |
| Flavor | 0.2 |

Example 8

| | Percent |
|---|---|
| Ethylene oxide polymer, average molecular weight approximately 2,000,000 | 54.5 |
| Liquid petrolatum | 40.0 |
| Isopropyl palmitate | 5.0 |
| Hexachlorophene | 0.2 |
| Flavor | 0.15 |
| Red dye | 0.15 |

The denture fixatives set forth in Examples 7 and 8 are employed by extruding thin strips thereof from collapsible metal or plastic tubes to the clean, dry surface of the dental plate and thereafter pressing the surface of the denture plate against the supporting mouth tissue.

It should be noted that in the above examples the polymers of ethylene oxide may have an average molecular weight exceeding approximately 500,000 and preferably between about approximately 500,000 and 5,000,000 or they may be mixtures of two or more ethylene oxide polymers of different average molecular weights between approximately 500,000 and 5,000,000. When the term "ethylene oxide polymers" is employed in the claims, what is meant is the compound of the general formula $H(OCH_2CH_2)_xOH$ wherein the molecular weight distribution of the polymers may be within a narrow or wide range or may fall within two or more separate ranges or groups which may or may not substantially overlap.

Examples of flavors which may be employed are spearmint, peppermint, methyl salicylate, clove oil and the like. The aforesaid are examples of plastic hydrophobic carrying materials which are generally considered to be gelatinous, semi-solid, amorphous masses, soluble in non-polar organic solvents but insoluble in water, derived from paraffin base petroleum by steam distillation. They may consist of any mixture of petrolatum, paraffin wax, or liquid petrolatum, so that the consistency thereof is semi-solid under normal temperature conditions. As employed herein, the term "natural gum" refers to any vegetable exudate or extract which is either soluble in, or swells in water and which consists of a carbohydrate polymer of high molecular weight, and is composed of acidic and/or mutual monosaccharide building units joined by glycosidic bonds. The term "synthetic gums" is used in its conventional sense, referring to high molecular weight polymers which possess the property of dissolving in or swelling in, water to give high viscosity solutions. Instead of the petrolatum hydrophobic vehicle, for the incorporation of the ethylene oxide polymers in paste carriers, fats, fatty acids and fatty acid esters or other suitable material may be used.

While there have been described and illustrated preferred embodiments of the present invention, it is apparent that numerous alterations and omissions may be made without departing from the spirit thereof.

We claim:

1. An improved artificial denture provided with a securing surface carrying a substantially anhydrous fixative comprising from 0.5% to 100% by weight of ethylene oxide homopolymers having an average molecular weight of between approximately 500,000 and 5,000,000.

2. An improved artificial denture provided with a securing surface carrying a substantially anhydrous fixative comprising at least 50% by weight of ethylene oxide homopolymers having an average molecular weight of between approximately 500,000 and 5,000,000.

3. An improved artificial denture provided with a securing surface carrying a substantially anhydrous fixative comprising a film including at least 0.5% by weight of ethylene oxide homopolymers having an average molecular weight of between approximately 500,000 and 5,000,000, the thickness of said film being between 5 and 50 mils.

4. An improved artificial denture provided with a securing surface carrying a substantially anhydrous fixative comprising a film of ethylene oxide homopolymers having an average molecular weight of approximately 2,000,000, said film having a thickness of between 5 and 50 mils.

5. An improved artificial denture provided with a securing surface carrying a fixative comprising a plastic hydrophobic carrying material and a hydrophilic material dispersed therein, said hydrophilic material containing at least 0.5% by weight of ethylene oxide homopolymers having molecular weights of between approximately 500,000 and 5,000,000.

6. An improved artificial denture in accordance with claim 5, wherein said hydrophobic carrying agent is selected from the class consisting of petrolatum, fats, fatty acids and fatty acid esters.

7. An improved artificial denture provided with a securing surface carrying a fixative comprising substantially equal portions by weight of petrolatum and ethylene oxide homopolymers having an average molecular weight of between approximately 500,000 and 5,000,000.

8. An improved artificial denture provided with a securing surface carrying a substantially anhydrous fixative comprising a gum and at least 0.5% by weight of said fixative of ethylene oxide homopolymers having a molecular weight of between approximately 500,000 and 5,000,000.

9. An improved artificial denture in accordance with claim 8, in which the gum is karaya.

10. An improved artificial denture in accordance with claim 8, in which the gum is an amylopectin.

11. An improved artificial denture fixative in accordance with claim 8, in which the gum is a water dispersible and water swelling derivative of cellulose.

12. An improved artificial denture in accordance with claim 8, in which the gum is carboxymethylcellulose.

13. An improved artificial denture in accordance with claim 8, wherein said fixative is in the form of a film of between 5 and 50 mil. thickness.

14. An improved artificial denture in accordance with claim 8, wherein said fixative is in the form of a suspension of the fixative agents in a hydrophobic carrier capable of being extruded from collapsible metal or plastic tubes.

15. An improved artificial denture provided with a securing surface carrying a substantially anhydrous fixative comprising from 0.5% to 100% by weight of ethylene oxide homopolymers having an average molecular weight of between approximately 2,000,000 and 3,000,000.

References Cited in the file of this patent

UNITED STATES PATENTS

| | | |
|---|---|---|
| 2,187,006 | Alvarado et al. | Jan. 16, 1940 |
| 2,300,074 | Strain | Oct. 27, 1942 |
| 2,756,875 | Yochim | July 31, 1956 |
| 2,830,370 | Rothrock | Apr. 15, 1958 |
| 2,866,761 | Hill et al. | Dec. 30, 1958 |

OTHER REFERENCES

Chemical and Engineering News, Nov. 11, 1957, page 62. (Copy in Scientific Library.)